United States Patent
Blumenthal et al.

(10) Patent No.: US 7,451,434 B1
(45) Date of Patent: Nov. 11, 2008

(54) PROGRAMMING WITH SHARED OBJECTS IN A SHARED MEMORY

(75) Inventors: Andreas Blumenthal, Heldelberg (DE); Helmut Prestel, Bad Schoenborn (DE); Andreas Simon Schmitt, Kalserslautern (DE); Rolf Hammer, Karlsruhe (DE); Holger Janz, Ketsch (DE); Kai Baumgarten, Rauenberg (DE); Erik Sodtke, Ubstadt-Weiher (DE); Ralf Wendelgass, Leimen (DE)

(73) Assignee: SAP Aktiengesellschaft, Walldorf ( * ) Notice: Subject to any disclaimer, the term of this patent is extended or adjusted under 35 U.S.C. 154(b) by 566 days.

(21) Appl. No.: 10/938,754

(22) Filed: Sep. 9, 2004

Related U.S. Application Data

(60) Provisional application No. 60/509,053, filed on Sep. 9, 2003.

(51) Int. Cl.
G06F 9/44 (2006.01)
G06F 7/00 (2006.01)

(52) U.S. Cl. .................. 717/116; 717/105; 717/122; 707/103 R

(58) Field of Classification Search .......... 717/101, 717/102, 106, 108
See application file for complete search history.

(56) References Cited

U.S. PATENT DOCUMENTS

| | | | |
|---|---|---|---|
| 5,966,512 A * | 10/1999 | Bates et al. ................ 709/205 |
| 5,995,098 A * | 11/1999 | Okada et al. ............... 715/752 |
| 6,557,056 B1 * | 4/2003 | Lanteigne et al. ........... 710/52 |
| 6,772,153 B1 * | 8/2004 | Bacon et al. ................ 707/8 |
| 6,823,511 B1 * | 11/2004 | McKenney et al. .......... 718/102 |
| 6,829,761 B1 * | 12/2004 | Sexton et al. ............... 717/165 |
| 7,035,870 B2 * | 4/2006 | McGuire et al. .......... 707/103 R |
| 7,076,629 B2 * | 7/2006 | Bonola ....................... 711/170 |
| 7,287,256 B1 * | 10/2007 | Lozben et al. .............. 719/316 |
| 2002/0112100 A1 * | 8/2002 | Zimmerman et al. ........ 710/1 |
| 2002/0174215 A1 * | 11/2002 | Schaefer .................... 709/224 |
| 2003/0093487 A1 * | 5/2003 | Czajkowski et al. ........ 709/213 |
| 2003/0097360 A1 * | 5/2003 | McGuire et al. ............ 707/8 |

* cited by examiner

*Primary Examiner*—Tuan Q. Dam
*Assistant Examiner*—Isaac T Tecklu
(74) *Attorney, Agent, or Firm*—Fish & Richardson P.C.

(57) ABSTRACT

A shared memory technology where shared objects can be used by any of multiple users, applications, or program sessions with programming language support during development and at runtime. The developer can declare shared memory behaviors at design time to cause one or more area classes to be generated for use at runtime. A shared objects memory is managed by the runtime environment. Content is stored at runtime in an area instance of an area class. Class methods to be generated that include methods for attaching and detaching a running session to and from an area instance, and for detaching a session from a change request on an area instance with a commit or a rollback. The runtime environment manages locks for area instances. There are programming language constructs for creating area instances and for creating data objects of arbitrary data type within area instances.

15 Claims, 3 Drawing Sheets

PROGRAMMING WITH SHARED OBJECTS IN A SHARED MEMORY

CROSS-REFERENCE TO RELATED APPLICATIONS

This application claims priority based on U.S. Patent Application No. 60/509,053 for Application Programming with Shared Memory, filed Sep. 9, 2003.

BACKGROUND

The present invention relates to digital data processing, and more particularly to application programming with shared memory.

Computer program applications generally involve user requests to store and access data. Business applications commonly involve user and program sessions that need concurrent access to large amounts of data by multiple users, program sessions, or both.

SUMMARY OF THE INVENTION

The present invention meets this need by providing a framework for creating and managing shared objects in a shared memory.

The data objects stored in the shared memory are also referred to as shared objects in this description. The part of the shared memory that is used for the administration and storage of the shared objects is referred to as shared objects memory.

A shared memory is shared in the sense that it does not belong to any particular process, user, or task, although it need not be available to every user or to every task on a computer or application server. The invention also provides for the convenient definition of shared objects' properties in a declarative way at design time.

The invention features the concept of an area. An area is like a class. It has a constructor and it has properties that are inherited by area instances. The data objects of an area instance are actual shared objects. Corresponding to an area is a programming language class that is generated for use by programs at runtime. The runtime area class has access methods by which the class is accessed. Thus, the invention embodies a clear separation between the specification of area characteristics (done at design time) and the actual The programming model of the invention is not designed for general purpose shared memory programming; rather, it is designed for particular application scenarios. An example of such a scenario is a product catalog implemented as a shared object (i.e., an object that exists in shared memory). The catalog in memory is created by operation of the constructor for the area of which the catalog is an instance. This object, the catalog, can exist as long as the underlying system (e.g., an SAP® Web Application Server) is running. The catalog in memory can be accessed by any number of users and any number of processes.

The invention can be used in a system where multiple program sessions can exist at one time for a user session (i.e., for application user logon), such as an SAP R/3 system. Each program session, which will be referred to simply as a session when the meaning is clear from context, has its own separate context data, which includes what is will be referred to as its roll area. More particularly, each user session has its own separate context data that is not visible for other user sessions. Each program session has its own separate context data that is not visible for other program sessions. With an area instance, data can be shared across user and program session bounds on a specific application server.

In principle, any kind of data object, in particular, aggregated data types (for example, tables) and strings, can be instantiated directly in the shared memory. A class can be instantiated in shared memory if it is flagged as "shared memory enabled". It is not necessary that the actual class definition be adapted for the class to be instantiated as a shared data object. It is also possible to store very large data objects, e.g., 15 gigabytes and larger, in the shared memory.

The language constructs used to create non-shared data objects are extended with runtime support to create shared data objects by the simple use of an additional parameter. For example, a shared object can be created in one system with a CREATE OBJECT statement executed with an AREA HANDLE parameter on an underlying class that is "shared memory enabled." The area handle allows the program to access a shared object graph starting at the root object of the area.

In a typical code sequence, a running program first attaches itself to a shared memory area in order to gain a handle. Then, it creates an object in shared memory associated with that handle and makes it the root object for an area instance. From there, the program can manipulate the shared object as it would any other object. When the program detaches from the area instance, the shared object becomes unavailable, and the program can indicate whether it wants to commit or roll back any changes made to the area instance.

Thus, with shared objects, a developer can use objects that include references to several other objects, stemming from the root object. These objects allow a program to store variables of any kind in shared memory for copy-free read access, because objects are directly accessed in shared memory and can be shared among different user and program sessions.

The invention features a locking concept that ensures that there are no parallel change users of an individual area instance. This locking is enforced by the runtime environment and is not merely a programming convention. The system checks the exclusiveness of the change user, which check cannot be bypassed. The lock logic is simple and transparent for application developers.

Simultaneous access by multiple readers (i.e., program sessions reading shared memory) is managed through read locks. Shared objects can be written or updated with a change lock. When a writer wants to update or insert a shared object in an area instance, the entire area instance is locked.

Areas can be implemented with a number of useful and powerful properties. The existence of these properties and their support by the development and runtime framework are important advantageous features.

One such area property is declared versioning. If versioning is activated for an area, read requests can be performed even during an update of the area instance. For areas with versioning, modifying the contents involves making a deep copy of the original area contents, which any active readers can continue to read. This is important in cases where large amounts of data are stored in the area and a large number of read users access the area in high availability scenarios. For areas without versioning, however, the original data is modified. The simultaneous writing of more than one version is not supported by versioning.

Another such area property is the lifetime of an instance. A catalog, for example, can be derived from a database that changes during the day. Nevertheless, it may be desirable not to rebuild the catalog every time the database changes, but rather to rebuild it once a day. This can be done by the framework on the basis of static properties declared for the corresponding area. The framework can also manage multiple versions of the catalog, so that a user having started working with one version will continue to do so even though a second version has been built, while new users use only the second version.

Another such area property is declared binding of an area to a transaction context of database operations. With such a binding, the setup of an area instance—i.e., the writing of data into the instance—is completed with a commit or terminated by means of a rollback that is tied to corresponding database operations, and do not take effect until the corresponding database operations take effect. With this property, it is easy for a developer to have the framework ensure the consistency of shared memory and database data.

Another such area property is declared propagation of an area beyond application server limits, whether the application servers are running on one machine or on multiple machines. An area can be instantiated on multiple application servers. When an area instance on one server changes, with area propagation, the other servers are automatically informed when an area instance is invalidated such that the corresponding area instances can be rebuilt again.

The invention also features a monitoring tool, by means of which the status of all areas can be monitored by an administrator. Information on the currently active area instances, their memory consumption, number and type of locks as well as the actual area contents can be monitored at any time. In particular, areas can be invalidated and locks can be released by an administrator.

The details of one or more embodiments of the invention are set forth in the accompanying drawings and the description below. Other features, aspects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

The present invention provides a framework implementing a simple and elegant programming model for storing and accessing shared memory data. This is not, however, intended to be a general purpose model. Instead, it is designed to support the following two frequently occurring application scenarios. In the first, which may be called the shared buffer scenario, there is one change user and a possibly large number of parallel read users, and updates are relatively rare. In the second, which may be called the exclusive buffer scenario, there is exactly one change user and one read user. These scenarios are especially well supported by the present invention.

In a shared buffer scenario, data is stored that is rarely provided or updated (e.g., an update interval of once a day up to once an hour) and can be quite large. Usually, a large number of read users simultaneously access the data. Therefore, one version of the data should always be available. Storing and maintaining a large catalog is an example of this high availability scenario.

In an exclusive buffer scenario, usually only one user accesses an exclusive buffer. In rare cases, there can be two users, one who only writes while the other only reads. However, the data stored in the exclusive buffer should be available for a longer term. An application for the use of an exclusive buffer is the shopping basket. When a shopping basket is being filled, there is exactly one updating user, the buyer. On the other side, there is exactly one reader reading the entries the buyer made. Quite often buyer requests are processed in a separate transaction. If, after this transaction has been completed, the data is to be available for further transactions, it can be stored in a shared memory.

Thus, to support the implementation of data-intensive business applications, the invention makes it possible to store globally any kind of data object in a shared memory. In this description, the term "data object" will be used to refer to any type of data and not only to objects in the object-oriented programming sense. Thus, a data object occupies memory and can be an instance of an object-oriented class; but it can also be an instance of an elementary data type, an aggregated data type, a string data type, a table, an array data type, a reference data type, or any other data type.

Figure 1:
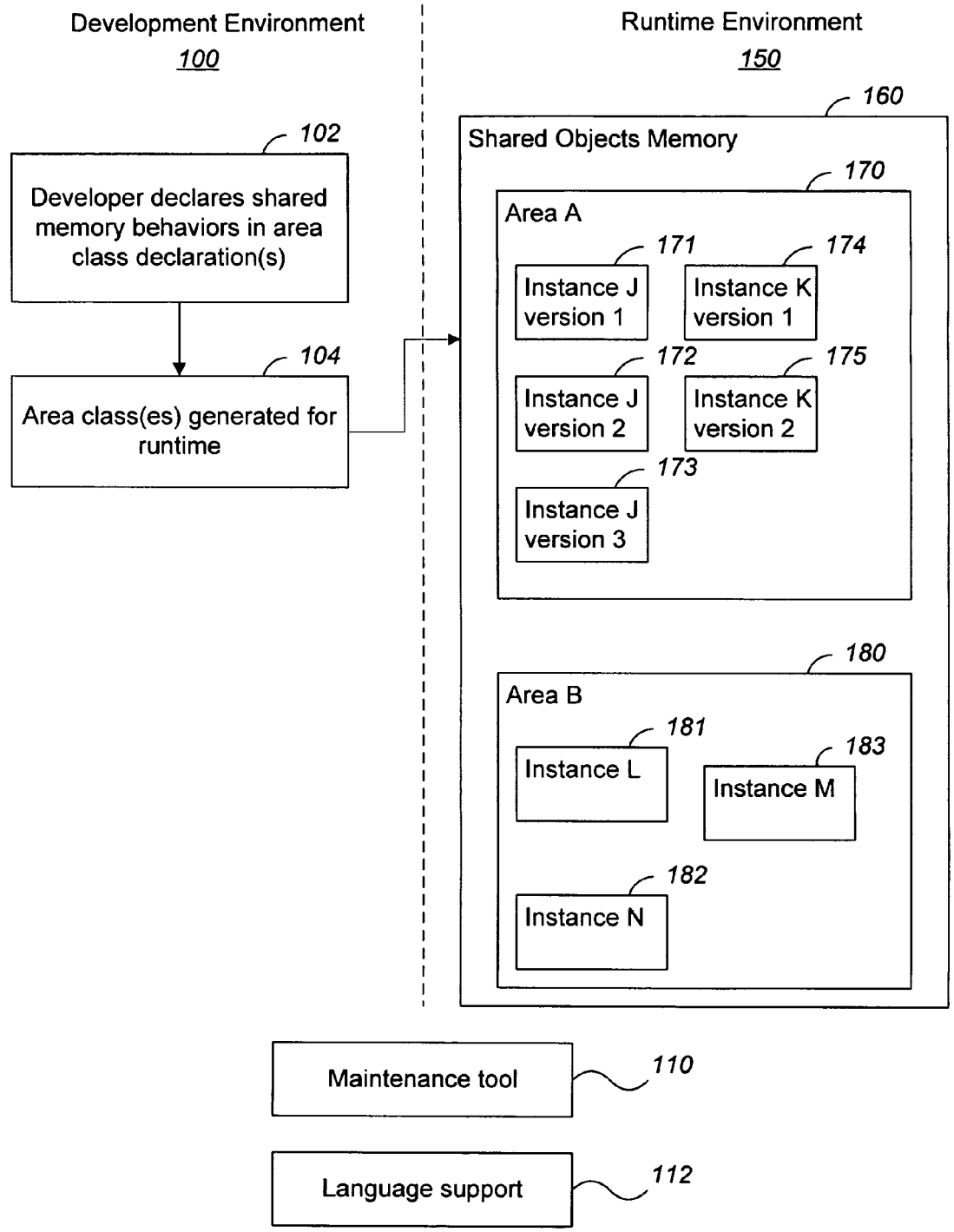
FIG. 1 is a block diagram illustrating the architecture of the invention.

As illustrated in FIG. 1, an area can be defined at design time by a developer using programs or tools provided by a development environment 100. For convenience, these will be referred to as the shared memory maintenance program, or more simply, the maintenance tool 110. Using the tool, all characteristics of the shared objects memory can be defined and areas can be managed.

Each area 162, 164 has a unique name. It is possible to create several area instances 171-175, 181-183 for each area. All area instances of one area have the same characteristics. Within an area, each area instance has a unique name that is specified at runtime when the area instance is created.

Figure 2:
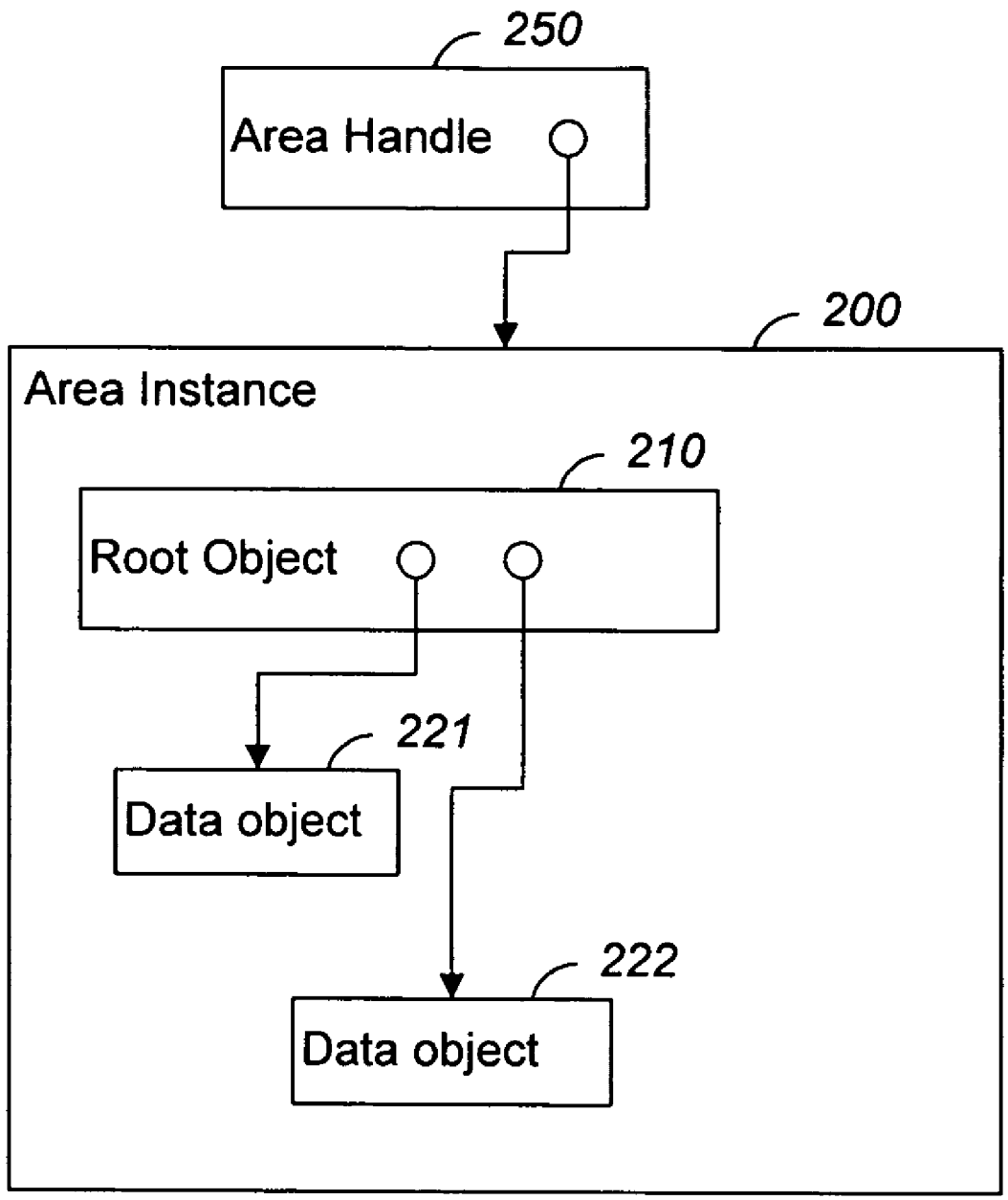
FIG. 2 is a further block diagram.

As illustrated in FIG. 2, many data objects 221, 222 can be stored in an area instance 200. The objects of an area instance are addressed by means of references. An area instance as such is self-contained; that is, once the area instance is set up, there are no pointers from the area instance to any data outside the area instance. The data objects within an area instance, on the other hand, may have references to each other.

Because areas are declared at design time, meaningful static type checking can be performed. For example, because the root data class of an area is statically known, a modification of the root data class automatically results in an invalidation of the area. The consistency of the data source (root class) for the area contents is thus ensured. Furthermore, static type checks can be carried out in cases where a shared memory area is used, whereas with other methods this is generally only possible at runtime.

Access to shared data objects is controlled by means of a simple lock logic that is managed as part of program operations for obtaining and releasing access to an area instance. A lock does not apply to individual data objects but to all objects in an area instance. A lock refers to exactly one area instance and does not affect other area instances. By default, a lock remains set until the end of the program session in which it was obtained. The two types of locks are for reading (read) and for changing. The latter are subdivided into locks for writing (write) and for updating (update). No parallel change users (write or update) are permitted on one and the same area instance; that is, there can only be a maximum of one change lock for each area instance at any point.

An area instance can be changed in two ways. Either the area instance is recreated (write) or the existing data in an area instance is modified (update).

With versioning, a new read lock is always set on the active version, and each version on an area instance passes through four life-cycle phases:

1. being set up As long as the version is being created by a writing user or modified by an updating user and has not yet been released by means of an area commit, it is being set up.
2. active The last version released by means of an area commit is active. All read requests are directed to this version.
3. out of date A version that still has read users accessing it, but which succeeding read users can no longer access, is called out of date (or also, obsolete).
4. expired A version that does not have any read users anymore and which succeeding read users can no longer access, is called expired. This version is automatically cleared by the garbage collector.

In an area with versioning, e.g. Area A 170, each area instance can have one or more area instance versions (which can be referred to simply as versions), e.g., the versions annotated 171-173 of instance J.

For the simplest case without versioning, e.g., Area B 180 no read accesses can occur until the current change user has completed his write operation. Change users are only granted access if no other lock is active.

During the creation of the second version, read accesses still refer to the active version. With the area commit of the version being built, the version being built becomes active and the previously active version becomes out of date.

If the area has more than two versions, parallel read users can read from more than two versions. For this purpose, the active version must have been replaced by a newly built version before another shared lock is set. In this case, several read users working on different out-of-date versions are involved.

In case of transactions with a long runtime it is helpful to be able to work with more than two versions. The number n of the required versions for an area instance depends on the relationship of the length of the shared locks (that is, the duration of the long-running program transaction) to the time interval between the request of two change locks (that is, the validity period of a version). If on average an exclusive lock is requested every s minutes and a read user on average needs r minutes for his read activity, the number n of the versions should not be less than r/s+1.

If shared locks are on the versions 1 to n−1 of an area instance and if the last version n is the active version, it is not possible to set a change lock. The active version of an area instance is therefore never invalidated by a change lock being set.

Embedding in Programming Language

The functionality of the invention is provided in the development and runtime environments of a programming language. In the following description, the implementation examples of an API (application programming interface) and other aspects of the invention will be based on the programming language ABAP, available from SAP AG of Walldorf (Baden) Germany.

Figure 3:
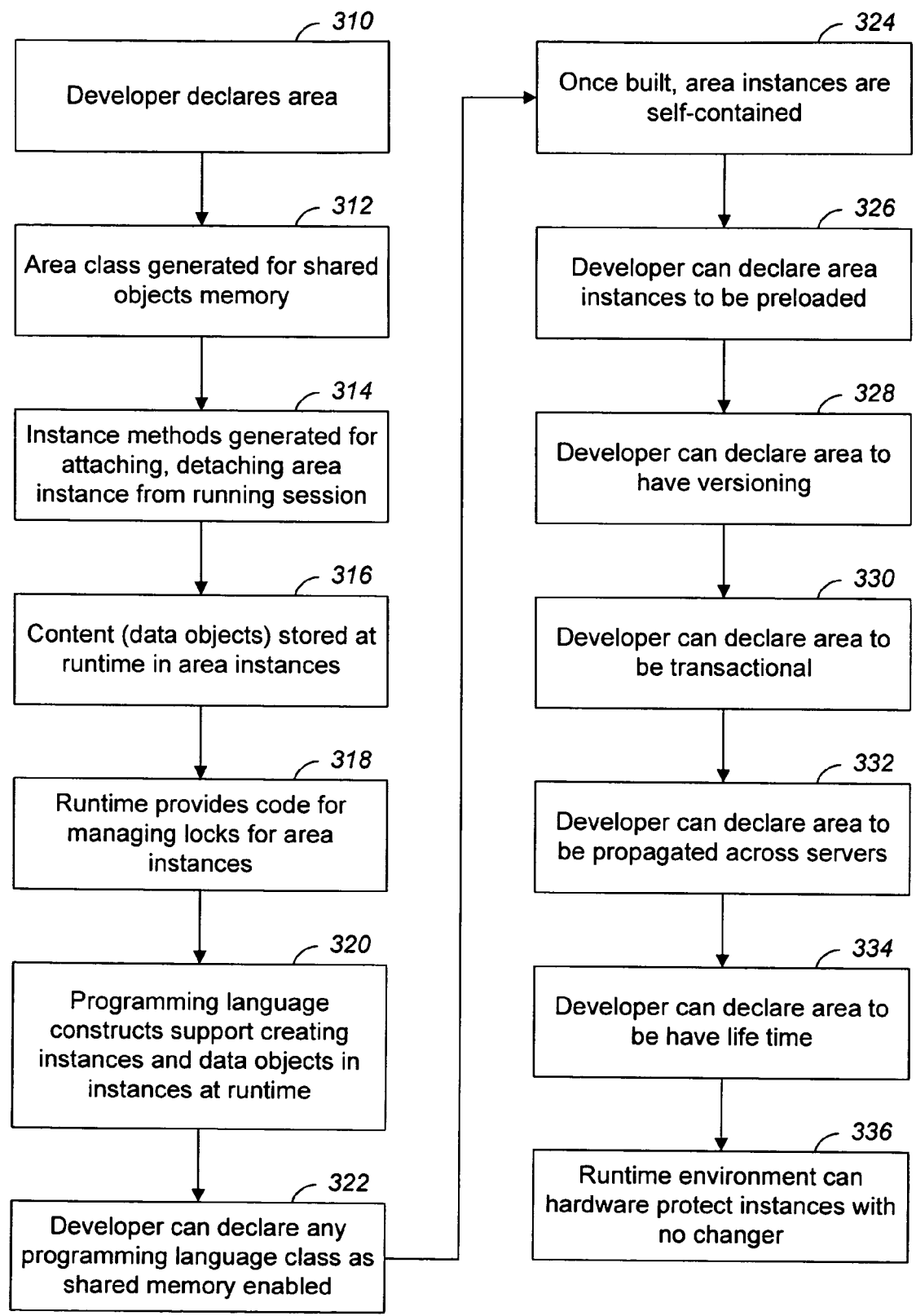
FIG. 3 is a flowchart illustrating actions taken in using the invention.

An overview is illustrated in FIGS. 1 and 3. A developer uses a development environment (100) to declare an area class at design time (300). The developer declares shared memory behaviors in the area class declaration (102, 310). The area class declaration causes the area class to be generated for use by an application at runtime as an organizational unit for a shared objects memory (104, 312). The shared objects memory 160 is a region of memory managed by the runtime environment 150 that is available to be shared by multiple sessions of one or more applications running in the runtime environment. The declaration of the area class causes instance methods to be defined and generated, the instance methods including methods for attaching and detaching a running session of an application to and from an area instance, a method for detaching a session from a change request on an area instance with a commit, and a method for detaching a session from a change request on an area instance with a rollback (314). Content is stored at runtime in area instances, e.g., instance 171, by applications (316).

Code in the runtime environment manages locks for area instances (318). Locks apply to individual area instances as a whole, and the runtime environment permits a particular area instance to be attached to by only (i) one or more readers, or (ii) exactly one changer, a changer being a writer or an updater, or (iii) no readers or changers. Code in the development and runtime environments 112 supports programming language constructs for creating area instances and programming language constructs for creating data objects within area instances, where the data objects can be of arbitrary data type including elementary data types, structures, and references (320).

The developer can declare any programming language classes as having the attribute that they are shared memory enabled (322). Every class that is shared memory enabled can be instantiated in an area instance. The runtime environment provides for the instantiation of arbitrary types of data objects in area instances. The class methods for attaching a session of an application to an area instance for reading, writing, and updating also request corresponding locks.

One build, area instances are self-contained (324). The runtime environment does not permit content in any area instance to contain references pointing outside the respective area instance after commit/rollback. Also, the runtime environment manages all references to content, providing type safety and complete control of references to content in area instances.

A developer can declare that an area instance can be automatically preloaded by an area class loader at server startup, at the initial (first occurring) read request, or after invalidation (326).

A developer can declare that an area class has versioning for instances of the area class (328). An area instance version can be in one of the following four states: under construction, active, out of date, or expired. The declaration of versioning allows the developer to define a maximum number of permitted area instance versions that can exist for a particular area instance at one time in the area class.

A developer can declare that an area class is transactional (330). An area instance of a transactional area class has its commit and rollback behavior tied to commit and rollback language constructs provided by the programming language and the runtime environment for database commits and rollbacks, and an area instance that experiences a detach and commit becomes active with the next database commit.

A developer can declare that an area class is propagated (332). An area instance of a propagated area class can be separately instantiated on several application servers, and whenever an area instance changes on one of the application servers, the runtime environment on that application server propagates to the other application servers an invalidation message, causing the other area instances to become out of date, which would cause them to be reloaded with current data.

A developer can declare that an area class has a life time (334). The life time of an area instance can be restricted by specifying: a refresh time, invalidation time, or idle time. The life time can also be bound to a user or program session.

The runtime environment can establish hardware memory protection for an area instance that has no changer attached to it. (336). This is possible on platforms that allow the runtime environment to set a hardware read-only status on areas that have no change locks.

Returning to FIG. 1, a maintenance tool 110 is used to create a shared objects memory 160. All attributes of the shared objects memory 1110 can be defined using the maintenance tool. These attributes then apply to all area instances of the area. To use an area instance, the user needs the ability to create data in the area instance. In addition, it must be ensured that there are no conflicts between the different read users and change users. The already generally described locking concept serves this purpose. In addition, the user needs methods to access the data in the shared objects memory.

The optional keyword AREA HANDLE my_handle for the commands CREATE DATA and CREATE OBJECT enables the creation of new data in an area instance. The area handle to be specified after AREA HANDLE explicitly specifies the type of the lock (read, write, update) and the area including the area instance and area instance version, to which the lock was set. The system returns the area handle as a reference to an instance of the class generated for each area to the user when he sets a lock.

The setting and releasing of the locks for accessing the data of an area instance is supported by (class) methods. The corresponding classes are automatically generated with the definition of a shared objects memory area. The base class cl_shm_area contains the basic functionality for the access to area instances. For each area created at design time, a new class which inherits its functionality from cl_shm_area is generated automatically. The class name of the generated class corresponds to the specified area name.

The class CL_SHM_AREA_MODEL serves as a model for the generation of area classes. If this model class changes, all generated area classes should be regenerated using the new model class. All generated area classes are final.

When working with the shared objects memory, the relationships between session memory and the shared objects memory represented in FIG. 3 exist. The user of the shared objects memory has an area handle 250 for each area instance 200, on which the user holds a lock. This area handle allows the user to access the root object 210 of the area instance and thus the data in the area instance.

Most errors that occur during operations on the area instances are returned as exception of the type cx_static_check. For this reason, almost all statements for accessing the area instances should be included in TRY and ENDTRY. To allow for a better legibility of the following examples, the error handling is generally omitted.

In the following example, based on ABAP, the "=>" is notation for a class component selector, which allows access to a static component of a class without creating an instance.

The "->" is notation for an object component selector, which allows access to the instance and static components of an object. The "REF TO" is a type constructor for a reference type. Reference types are deep types, and data objects of these types only point to actual work data.

```
DATA:
my_handle TYPE REF TO cl_my_area,    "Area cl_my_area has
                                     already been
                                     "created in maintenance tool;
                                     "there the class cl_my_area
                                     "was autmatically generated;
                                     "cl_my_area is
                                     "a non-transactional area
my_data   TYPE REF TO cl_my_data.    "root object (instance of
                                     "root data classes) for storing
                                     "data in the shared objects
                                     memory
* Setting an exclusive lock
my_handle = cl_my_area=>attach_for_write ( ).
* Creating the root object in the shared objects memory
CREATE OBJECT my_data HANDLE my_handle.
* Link to the root object
my_handle->set_root ( my_data ).
* Storing a value in the root object
my_data->number = 4.    "the class cl_my data includes the
                        "instance attribute number of the type i
* Release exclusive lock
my_handle->detach_commit ( ).
* Set shared lock
my_handle = cl_my_area=>attach_for_read ( ).
* Displaying the stored value
WRITE my_handle->root->number.
* Release shared lock
my_handle->detach ( ).
```

Creating a Data Object in the Shared Objects Memory

This part of the description deals with the creation of data objects in the shared objects memory.

From the point of view of a change user, data objects are created in the shared objects memory with the help of the CREATE statement in connection with the specification of an area instance version after a change lock has been set. The version is specified by means of the area handle received when setting the change lock. Only dynamically generated data objects can be created in the shared objects memory.

The specification of the handles is done with the keyword HANDLE.

CREATE DATA dref HANDLE my_handle . . .
CREATE OBJECT oref HANDLE my_handle . . .

The keyword HANDLE must be specified directly after the data or object reference. The specification of TYPE, EXPORTING, and so forth, follows after the handle.

The following exceptions can occur when executing CREATE:

cx_shm_wrong handle with the text element:
  write_handle_required: A read handle was passed.
cx_shm_already_detached: The lock has already been released with a detach.
cx_shm_not_enabled: The object cannot be created because its class is not shared memory enabled.
cx_shm_out_of_memory with the text elements:
out_of_admin_memory: There is not sufficient memory in the shared objects memory.
out_of_area_memory: The memory limit specified for the area is exceeded with the creation of the data objects.
out_of_version_memory: The memory limit specified for each version of the area instance is exceeded with the creation of the data objects.

The first two exceptions have the common superclass cx_shm_general_error and should be dealt with locally (cx_dynamic_check). The memory errors do not force any local processing (cx_no_check). These memory errors can occur with every change access to the shared objects memory, for example, if an internal table contained in an area instance is extended with APPEND or INSERT. Memory errors in the shared objects memory do not result in runtime errors that cannot be caught. This behavior enables further access to the data contained in non-shared program memory and, following a memory release, a recreation of the area instance in the shared objects memory.

Each access to the contents of data objects must be performed by means of references, since only data objects can be created in the shared objects memory. In ABAP, two types for accessing the data accessible by means of references are available. One type is the dereferencing of the reference to the data object with each access. For data references, the type of the reference object must be specified completely. One can, however, also store the dereferenced reference in a field symbol and perform all accesses to the data object by means of the field symbol.

Generated Area Classes

Now the generated classes will be described. A class is generated for each area defined at design time. The name of this class corresponds to the specified area name.

Classes generated per area contain (class) methods that can be used to perform all functions for working with the shared objects memory, such as setting and removing locks. The generated area class inherits a lot of functions from the class cl_shm_area so that only very little source code must be generated. The user is not allowed to modify the automatically generated class.

The user must specify a root data class when he creates an area. The root object of every area instance of the area is an instance of the root data class. All data stored in an area instance must therefore be stored in instance attributes of the root object or must be accessible through references from the instance attributes of the root object.

A further class provides the area constructor for the automatic build of the area instances. The specification of an area constructor class is not necessarily required. If no area constructor class is specified, an automatic build of the area instances of this area is not possible. The constructor class can be used simultaneously as wrapper class for accessing the area instances. Because of the accesses being wrapped, the user of the wrapper class does not need an area handle nor must he worry about setting and removing locks. For the user of the wrapper class, accessing the shared objects memory is like accessing any other memory.

The following sections explain in detail the (class) methods implemented in the base class cl_shm_area and in the class generated for each area.

Setting a Lock

Setting a Shared Lock

Setting a shared lock is done with the help of the class method attach_for_read( ):

```
CLASS-METHODS attach_for_read
    IMPORTING   inst_name       TYPE shm_inst_name
                                DEFAULT
cl_shm_area=>default_instance
    RETURNING   value (handle)  TYPE REF TO cl_my_area
    RAISING     cx_shm_inconsistent
                cx_shm_no_active_version
                cx_shm_read_lock_active
                cx_shm_exclusive_lock_active.
```

The method returns a reference to an object of the type cl_my_area, by means of which the contents of the area instance version can then be accessed. This object is referred to as an area handle.

The parameter inst_name specifies the name of the area instance. If only one area instance of the area is to be created, the parameter inst_name does not have to be passed when the method is called. In this case, the area instance name ($DEFAULT_INSTANCE$) entered in the class constant default_instance of the class cl_shm_area is used. This applies to all methods, for which the parameter inst_name can be specified.

To avoid programming errors when using several area instances of an area, one should specify a unique name for all area instances and not use the default name.

In a program session, there can be a maximum of one shared lock on each area instance. If it should be necessary for a program to access this area instance at different places/points in time, there are two possibilities: (1) The shared lock is newly set prior to each access to the area instance and then released again. (2) The shared lock is set prior to the first access to the area instance and kept until the last access to the area instance.

The advantage of solution (1) is that it can be programmed easily. However, the newly requested shared lock is always set to the active version, that is, the consistency of the read data is not ensured with this procedure.

With solution (2), the once requested read handle must be available at every program location, where the area instance is accessed in read mode. For this purpose, the handle must be passed as a parameter to each modularization unit of the program or a factory class for the administration of the locks must be implemented.

The following exceptions can occur when attach_for_read( ) is called:

cx_shm_inconsistent: The definition of a type of a data object included in the area instance does not correspond to the definition of the type used in the attached program.

cx_shm_no_active_version with the text elements:

neither_build_nor_load: The area instance does not exist. An automatic build of the area instance could not be triggered since neither an active area constructor nor a displaced version of the area instance exists.

build_started: The area constructor for setting up the area instance was called.

build_not_finished: The area constructor for setting up the area instance is already running.

load_started: The deserialization routine for loading the area instance was called.

load_not_finished: The deserialization routine for loading the area instance is already running.

cx_shm_read_lock_active: A shared lock on this area instance already exists in the same program session.

cx_shm_exclusive_lock_active with the text elements:

locked_by_active_changer: An active change user already exists on this area instance. This message can occur only with area instances without versioning.

locked_by_pending_changer: There is a change user already waiting for the change lock for this area instance with cl_shm_area=>attach_mode_wait. This message can occur only with area instances without versioning.

All listed exceptions are subclasses of the exception class cx_shm_attach_error.

If an exception occurs when a shared lock is set, the actual parameter that accepts the return code handle remains unchanged. This behavior also applies to the return codes of the methods describe below.

Setting an Exclusive Lock

The class method attach_for_write( ) sets an exclusive lock on an area instance:

```
CLASS-METHODS attach_for_write
    IMPORTING    inst_name      TYPE shm_inst_name
                                    DEFAULT cl_shm_area=>default_instance
                 mode           TYPE shm_attach_mode
                                    DEFAULT
cl_shm_area=>attach_mode_default
                 wait_time      TYPE i
                                    DEFAULT 0
    RETURNING    value(handle)  TYPE REF TO cl_my_area
    RAISING      cx_shm_version_limit_exceeded
                 cx_shm_exclusive_lock_active
                 cx_shm_change_lock_active.
                 cx_shm_parameter_error.
```

The two parameters attach_mode and wait_time for specifying the attach mode are optional. attach_mode can assume the following values:

| | |
|---|---|
| cl_shm_area=> attach_mode_default | All read users on this area instance may continue with their reading activity. This is the default value. |
| cl_shm_area=> attach_mode_detach_ read user | If setting an exclusive lock should not be possible because at least one read user is active on all versions, a removal of the shared locks on the oldest version is forced. All shared locks are therefore removed for area instances without versioning. Due to the removal of the shared locks, the oldest version is set to expired and a free version is available for setting up a new version. |
| cl_shm_area=> attach_mode_wait | If setting the exclusive lock is not possible, the program waits a maximum of wait_time milliseconds. The queue activity is terminated early if setting the exclusive lock was successful. If the area instance does not have any versioning, no new read user can attach to the area instance during this wait time. Setting shared locks is still possible for area instances with versioning. |

The following exceptions must be caught when the exclusive lock is set:

cx_shm_version_limit_exceeded: All available versions have shared locks. For an area instance without versioning, this exception means that currently a shared lock is on the area instance.

cx_shm_exclusive_lock_active with the text elements:

locked_by_active_changer: An active change user is already on this area instance in another program session.

locked_by_pending_changer: There is a change user already waiting for the change lock for this area instance with cl_shm_area=>attach_mode_wait.

cx_shm_change_lock_active: A change lock is already active in the same program session or a user is already waiting for a change lock for any area instance with cl_shm_area=>attach_mode wait. The class method multi_attach( ) can be used for simultaneously calling two or more change locks.

cx_shm_parameter_error: An erroneous parameter was passed.

Thus there are three situations in which setting a change lock is not possible:

(1) Shared locks are on all area instance versions.

(2) A change lock is already on the area instance.

(3) A change lock already exists on any area instance in a program session.

Situation (3) is to avoid deadlocks. In the following case, situation (2) and (3) occur simultaneously: In program session i, a change lock already exists on the area instance g. In i a second change lock for g is now requested. In this case, the second attach_for_write( ) returns the exception belonging to situation (3) (cx_shm_change_lock_active).

Setting a Change Lock

The class method attach_for_update( ) is available for updating the contents of an area instance:

```
CLASS-METHODS attach_for_update
    IMPORTING    inst_name   TYPE shm_inst_name
                                 DEFAULT cl_shm_area=>default_instance
                 mode        TYPE shm_attach_mode
                                 DEFAULT cl_shm_area=>attach_mode_default
                 wait_time   TYPE i
                                 DEFAULT 0
    RETURNING    value(handle) TYPE REF TO cl_my_area
    RAISING      cx_shm_inconsistent
                 cx_shm_no_active_version
                 cx_shm_version_limit_exceeded
                 cx_shm_exclusive_lock_active
                 cx_shm_change lock_active.
                 cx_shm_parameter_error.
```

The semantics of the parameters is equivalent to the one introduced for the method attach_for_write( ). If it is an area instance with versioning, the update implies making a copy (deep copy) of the active area instance version. The new version can then be updated.

The following exceptions must be caught when the method attach_for_update( ) is called:

cx_shm_inconsistent: The definition of a type of a data object contained in the area instance does not correspond to the definition of the type used in the attached program.

cx_shm_no_active_version with the text elements:

neither_build_nor_load: The area instance does not exist. An automatic build of the area instance could not be triggered since a displaced version of the area instance does not exist.

load_started: The deserialization routine for loading the area instance was called.

load_not_finished: The deserialization routine for loading the area instance is already running.

cx_shm_version_limit_exceeded: All available versions have shared locks. For an area instance without versioning, this exception means that a shared lock is currently on the area instance.

cx_shm_exclusive_lock_active with the text elements:

locked_by_active_changer: An active change user already exists on this area instance in another program session.

locked_by_pending_changer: There is a change user already waiting for the change lock for this area instance with cl_shm_area=>attach_mode_wait.

cx_shm_change_lock_active: A change lock is already active in the same program session or a user is already waiting for a change lock for any area instance with cl_shm_area=>attach_mode_wait. The class method multi_attach( ) can be used for simultaneously calling two or more change locks.

cx_shm_parameter_error: An erroneous parameter was passed.

Simultaneous Setting of Several Locks

To avoid deadlocks within a program session, all exclusive locks (on different area instances of the same or another area) must be requested at the same time. Only shared locks can be set one after the other. If several change accesses to area instances are intended simultaneously, the class method multi_attach( ) has to be used:

| CLASS-METHODS | multi_attach | | |
|---|---|---|---|
| | IMPORTING | ignore_errors | TYPE bool DEFAULT false |
| | | wait_time | TYPE i DEFAULT 0 |
| | EXPORTING | error_flag | TYPE bool |
| | CHANGING | attach_tab | TYPE shm_attach_tab. |

The table type shm_attach_tab is defined as follows:
TYPES:
shm_attach_tab TYPE HASHED TABLE
  OF shm_attach
  With Unique Key
    client
    area_name
    inst_name
    lock_kind.

A table entry of the type shm_attach contains the following entries:

| | |
|---|---|
| client<br>  TYPE mandt | Client of the area. When a lock is set on a client-independent area, this entry must be initial, i.e., must have its type-specific initial value, which here indicates there is no client. |
| area_name<br>  TYPE shm_area_name | Area name, corresponds to the name of the derived class. |
| inst_name<br>  TYPE shm_inst_name | Name of the area instance. |
| lock_kind<br>  TYPE shm_lock_kind | Access type:<br>cl_shm_area=>lock_kind_read,<br>cl_shm_area=>lock_kind_write or<br>cl_shm_area=>lock_kind_update |
| attach_mode<br>  TYPE shm_attach_mode | Behavior with change accesses; can be different for each area instance; locks are internally requested one after the other |

-continued

| | |
|---|---|
| level<br>TYPE I | Internally the locks are set one after the other. The locks are set in the following sequence: if $level_x$ is smaller than $level_y$, then lock x is requested before lock y. If $level_x = level_y$ and the table entry x was inserted before table entry y, lock x is requested before lock y. If all table entries have the same entry in the level column (for example, the default value 0), the sequence of the requests to lock corresponds to the insert sequence of the table entries. |
| trade<br>TYPE REF TO cl_shm_area | A separate area handle is provided for each area instance (table entry) entered in the table. It can be found in this column following a successful execution of multi attache( ). |
| exception<br>TYPE REF TO cx_shm_attach_error | If an exception is triggered when the lock is set, a reference to the instance of the corresponding error class is in this column. |

The parameter wait_time specifies the total of all wait times for all requests of a change lock with attach_mode= cl_shm_area=>attach_mode_wait. A wait time of wait_time milliseconds is available for the first attach with the parameter wait. A wait time of wait_time minus the wait time required for the first attach is available for the second attach with the parameter wait. For all further requests for change locks with the parameter wait, the value wait_time is reduced by the already required wait time.

If the parameter ignoring_errors is set to false, the class method multi_attach( ) terminates with the request for the locks as soon as an error occurs when a lock is requested. In this case, the return parameter error_flag has the value true. The table entry, in which the error occurred, contains the exception object that belongs to the error in the column exception. In case of an error, the contents of the column handle (all rows) and the column exception (all rows except for the one) is initial after multi_attach( ) has been called, and all other columns of the table remain unchanged. (That a variable is initial means that it has a type-specific initial value, denoted INITIAL, that a variable also has when it is cleared; for a reference, in effect, the value is a null pointer value.) To increase the runtime of multi_attach( ), locks for which the request has a high probability of being rejected should be requested first, that is, they should contain a low value in the column level.

All area instances, to which a lock was set before the error occurred, are reset to the status they had prior to the multi_attach( ), that is, it acts as if an attach to the area instances never occurred.

If the parameter ignore_errors is set to true, the class method multi_attach( ) tries to set the remaining locks even after an error has occurred. In the rows, in which an error occurred, the area handle is set to INITIAL and the exception object is returned by means of the column exception. If the lock could be set successfully, the value INITIAL is entered in the column exception for the corresponding table entry.

Note that multi_attach( ) does return any of the exceptions specified for attach_for . . . ( ), but it indicates these errors through the return code error_flag. If error_flag=false is valid, all locks can be set successfully.

In addition to the exceptions specified for attach_for . . . ( ), the table column exception can also be filled with an object of the following exception class:

cx_shm_multi_attach_error with the text elements:
illegal_attach_mode: attach_mode is not initial for a read access.
duplicate_change_lock: For an area instance, a write and a change lock were requested.

If a change lock is already active in a program session when multi_attach( ) is called, only shared locks can be successfully set with the multi_attach( ). In case a further change lock is requested, the column exception is filled with an exception object of the class cx_shm_change_lock_active.

The locks requested with multi_attach( ) can be released in any sequence.

A hash table is used for transferring data to the method multi_attach( ) since the insert operations are possible in constant time and at the same time a check for double entries is realized by means of the key fields.

Releasing a Lock

When explaining the functionality for releasing a lock, a distinction between transactional and non-transactional areas must be made. For transactional areas, all area instance changes become simultaneously active together with the database updates at the end of a database transaction, which is an inseparable sequence of database operations. In contrast to this, there are no dependencies between the database activities and the lock mechanism for the area instances for non-transactional areas.

Releasing a Shared Lock

A shared lock on an area instance can be explicitly released again with the help of the parameter-free instance method detach( ):

METHODS detach
RAISING cx_shm_wrong_handle
cx_shm_already_detached.

A shared lock is automatically released with the termination of the program session, in which the lock was requested. If a new program session is opened, the shared lock still exists after returning from the new program session.

The following exceptions can occur with the release of a shared lock by means of detach( ):

cx_shm_wrong_handle: detach( ) was called from a change lock. The change lock is still active.
cx_shm_already_detached: Each lock may be released only once.

Both exceptions are declared as a dynamic check and thus do not force any processing.

Should a lock be cleared as shown in the program segment below, the lock on the area is not released.

TRY.
my_handle = cl_my_area=>attach_for_read( ).
CATCH cx_shm_attach_error.
". . . Error handling
ENDTRY.
CLEAR my_handle.

The read lock on the area instance can no longer be explicitly released with a detach( ) but instead remains set until the end of the current program session.

The following exceptions can occur with the release of a read lock by means of detach( ):

cx_shm_wrong_handle: with the text element:
read_handle_required: detach( ) was called from a change lock. The change lock is still active.
cx_shm_already_detached: Each lock may be released only once.

Both exceptions are declared as a dynamic check and thus do not force any processing.

Releasing a Change Lock and Confirming the New Version

A change lock can be released with the instance method detach_commit( ).

METHODS detach_commit
RAISING cx_shm_wrong_handle
cx_shm_already_detached
cx_shm_completion_error
cx_shm_secondary_commit.

If a detach_commit( ) is called for my_handle, the event shm_rollback_event of the area instance is automatically triggered and all methods registered for this event are performed in the order of registration.

After all the registered methods have run, it is determined whether the root object of the area instance is valid. If not, the exception cx_shm_root_object_initial is raised.

Once the validity of the root object has been checked, the garbage collector is started. It removes all objects that cannot be reached from the root object.

A check is then made of whether references from the area instance in the shared objects memory to other memory or to other area instances still exist. If this is the case, the user receives the exception cx_shm_external_reference.

With serializable area instances (displace_kind = cl_shm_area=>displace_kind_serializable), a test is also made of whether all classes instantiated in the area instance implement the tag interface if_serializable_object. If this is not the case for an instantiated class, the exception cx_shm_object_not_serializable is triggered.

For transactional area instances, the changes completed with an area commit only become active with the next database commit. The newly created version is therefore still being built until the database commit and becomes active only with the database commit. Thus for transactional areas with versioning, all shared locks requested between the area commit and the database commit are not yet on the just written version but on the version confirmed with a database commit. For transactional areas without versioning, a read access is therefore not possible between the area commit and the database commit. It is neither possible to set a new change lock between the area commit and the database commit for areas with versioning nor for areas without versioning. If an area rollback is carried out, a new change lock can be set immediately.

For non-transactional areas, the area instance changes become immediately active after the area commit, that is, all newly requested shared locks are immediately on the just written version.

Unlike shared locks, change locks must always be released explicitly. The following points in time are given, at which no change lock may be active anymore. Should a change lock nevertheless still be active at these times, a runtime error system_shm_change_lock_active occurs that cannot be caught;

At the end of a program session, no change locks set in the session may be active. If a program session ends owning any change lock, it is released with a detach_rollback( ).
For transactional areas, no change locks must be active when the database commit is performed.
When a new program session is started, no change lock must be active for transactional areas.

If a runtime error occurs that cannot be caught while a change lock is active, the change locks are released and the changes are rejected.

The following exceptions can occur when detach_commit( ) is called:

cx_shm_wrong_handle with the text element: write_handle_is_required. detach_rollback( ) was called from a shared lock. The shared lock is still active.
cx_shm_already_detached: Each lock may be released only once.
cx_shm_completion_error with the subclasses:
cx_shm_event_execution_failed: An error occurred during the execution of a method registered for a shm_commit_event event.
cx_shm_root_object_initial: No root object was assigned to the area instance.
cx_shm_external_reference: References from the shared objects memory to another area instance of the shared objects memory or to other memory still exist.
cx_shm_object_not_serializable: An object stored in the area instance is the instance of a data class that did not implement the interface
if_serializable_object. This only causes an error if the area instance maybe displaced (displace_kind = cl_shm_area=>displace_kind_serializable).
If an exception of the class cx_shm_completion_error occurs, the change lock has not been released yet due to debugging purposes. However, this change lock can only be released with detach_rollback( ).
cx_shm_secondary_commit: A lock, for which a detach_commit( ) failed with cx_shm_completion_error, may only be released with detach_rollback( ).

The exceptions cx_shm_wrong_handle and cx_shm_already_detached are declared as a dynamic check and thus do not force any processing. The exceptions cx_shm_completion_error and cx_shm_secondary_commit are subclasses of the exception class cx_shm_detach_error and must always be dealt with (static check).

Releasing a Change Lock and Rejecting the New Version

To reject the made changes when releasing the lock, a program must call up the instance method detach_rollback( ):

METHODS detach_rollback
RAISING cx_shm_wrong_handle
cx_shm_already_detached.

As with a detach_commit( ), upon the call of detach_rollback( ), the event shm_rollback_event is triggered and all methods registered for this event are started.

For an area instance without versioning, calling detach_rollback( ) results in no active version of the area exists anymore. For area instances with versioning, the previous version is still available for access. If a rollback frequently occurs when an area instance is changed, it is highly recommended to use versioning.

The following exceptions can occur when detach_rollback( ) is called:
- cx_shm_wrong_handle with the text element: write_handle_is_required. detach_rollback( ) was called from a shared lock. The shared lock is still active.
- cx_shm_already_detached: Each lock may be released only once.
- cx_shm_event_execution_failed: A method executing in response to a shm_rollback_event experienced an error.

The first two exceptions are declared as a dynamic check and thus do not force any processing. The third is static.

Releasing Several Locks

The class method detach_area( ) releases all locks in the same program session on all area instances of an area:

CLASS-METHODS detach_area
    RETURNING value(rc) TYPE shm_rc.

The class method detach_area( ) returns all error messages by means of the rc parameter. This has the following meaning:

cl_shm_area=>rc_done
    All locks were released successfully.

cl_shm_area=>rc_nothing_to_be_done
    No locks on the area instances of the specified area exist in the same program session.
    Therefore, there are no locks to be released.

If a change lock is released with the class method detach_area( ), a rollback is carried out on the corresponding version of the area instance, that is, the not yet completely written or updated version is rejected.

detach_all_areas( ) is available as the most powerful method for the session-internal release of locks. With this method all locks that point to any area instance of any area in the same program session are released:

CLASS-METHODS detach_all_areas
    RETURNING value(rc) TYPE shm_rc.

The return parameter rc has the following meaning:

cl_shm_area=>rc_done
    All locks were released successfully.

cl_shm_area=>rc_nothing_to_be_done
    No locks on the area instances in the shared objects memory exist in the same program session. Therefore, there are no locks to be released.

If a change lock is released with the class method detach_all_areas( ), a rollback is carried out on the corresponding version of the area instance, that is, the not yet completely written or updated version is rejected.

Invalidating an Active Version

To prevent that new read or update users attach to an area instance version, an area instance version can be flagged as out-of-date. Following the execution of invalidate_instance( ), an already attached read user can continue with their read session on the corresponding area instance version. However, it is not possible to set a new read or change lock on this area instance version. From a functional view point, invalidate_instance( ) only sets the active version of the area instance to out-of-date. This activity can also be referred to as soft deletion:

```
CLASS-METHODS invalidate_instance
    IMPORTING   inst_name           TYPE shm_inst_name
                                    DEFAULT
cl_shm_area=>default_instance
                terminate_changer TYPE bool
                                    DEFAULT true
    RETURNING   value(rc)           TYPE shm_rc.
```

If a change lock is on the area instance when invalidate_instance( ) is executed, the change user is not affected by this class method in the case of terminate_changer = false. If terminate_changer = true applies, the change lock is released.

For the class method invalidate_instance( ), a distinction must again be made between non-transactional and transactional areas: For non-transactional areas invalidate_instance( ) is executed immediately. For a transactional area, the area instance is not invalidated before with the next database commit.

By execution the invalidate_instance( ) after the database commit, the area version created as follows is never active since it expires again immediately after the database commit:

cl_my_area=>invalidate_instance( terminate_changer = true ).

handle = cl_my_area=>attach_for_write( ).

... " Code for area build handle->detach_commit( )

... " explicit or implicit database commit

The return parameter rc of the class method invalidate_instance( ) can assume the following values for non-transactional area instances.

| | |
|---|---|
| cl_shm_area=>rc_done<br>terminate_changer = true: | The active area instance version was successfully set to out-of-date or a change lock was released. |
| terminate_changer = false: | The active area instance version was successfully set to out-of-date. |
| cl_shm_area=>rc_nothing_to_be_done<br>terminate_changer = true: | Neither an active area instance version nor a change lock on the specified area instance exist in the shared objects memory. |
| terminate_changer = false: | An active area instance version does not exist in the shared objects memory. |
| cl_shm_area=>rc_instance_name_not_found<br>terminate_changer = true: | The specified area instance does not exist. |
| terminate_changer = false: | The specified area instance does not exist. |
| cl_shm_area=>rc_done | is always returned for transactional area instances. |

The class method invalidate_area( ) to perform a soft deletion of all area instances:

```
CLASS-METHODS invalidate_area
    IMPORTING terminate_changer    TYPE bool
                                   DEFAULT true
    RETURNING value(rc)            TYPE shm_rc.
```

The same distinction between transactional and non-transactional areas that was made for invalidate_instance( ) has to be made for invalidate_area( ). In the case of a non-transactional area, the return parameter rc returns the following information:

|  | terminate_changer = true: | terminate_changer = false: |
| --- | --- | --- |
| cl_shm_area=>rc_done | The active versions of all area instances of the area were successfully set to out-of-date and/or all change locks were released. | The active versions of all area instances of the area were successfully set to out-of-date. |
| cl_shm_area=> rc_nothing_to_be_done | Neither an active version of an area instance nor a change lock exists in the shared objects memory. | An active version of an area instance does not exist in the shared objects memory. |

For transactional area instances, cl_shm_area=>rc_done is always returned.

Cross-server Synchronization of Area Instances

If an area instance is accessed from different servers, the change to the area contents on one server must be communicated to the other servers. The change information is forwarded by sending synchronization records. The receipt of a synchronization record results in the active version of the corresponding area instance being flagged as out-of-date. For this reason, the synchronization of an area instance is equivalent to calling the class method invalidate . . . ( ) with terminate_changer = true on all servers involved in the synchronization.

The class methods for synchronization are only generated if the area is flagged at design time as capable of being synchronized. Synchronization occurs with the next database commit.

The class method synchronize_instance( ) can be used for synchronizing an area instance:

CLASS-METHODS synchronize_instance
IMPORTING
    inst_name
        TYPE    shm_inst_name    DEFAULT cl_shm_area=>default_instance
    affecting_local_server
        TYPE bool DEFAULT false
RAISING cx_shm_parameter_error.

The parameter affecting_local_server can be used to control whether the synchronization records are also to be sent to the server, where the class method synchronize_instance( ) was called. If affecting_local_server = false is set, only all other servers execute invalidate . . . and not the calling server. The intention of this setting is to preserve a version newly created on a server and to invalidate only the active versions on other servers. If affecting_local_server = true is set, the active versions of the area instance are invalidated on all servers. This setting can be used if, after changes to the database contents, the contents of the area instance are to be changed with the help of the area constructor. In addition, the use of this option simultaneously activates the area changes on all servers.

If all area instances of an area are to be synchronized, the class method synchronize_area( ) must be called.

CLASS-METHODS synchronize_area
IMPORTING    affecting_local_server    TYPE    bool
    DEFAULT false
RAISING cx_shm_parameter_error.

The methods synchronize_instance( ) and synchronize_area( ) do not return any error messages.

Deleting Versions

In addition to the soft deletion of area instances on a server (invalidate . . . ( )), the option to hard delete an area instance locally on a server also exists. The hard deletion does not only prevent new read users from attaching to an area instance but also that all existing shared locks are released.

The class method free_instance( ) can be used for hard deletion:

```
CLASS-METHODS free_instance
    IMPORTING inst_name           TYPE shm_inst_name
                                  DEFAULT
      cl_shm_area=>default_instance
              terminate_changer   TYPE bool
                                  DEFAULT true
    RETURNING value (rc)          TYPE REF TO cl_shm_rc
    RAISING     cx_shm_parameter_error.
```

As for the soft deletion with the class method invalidate_instance( ), free_instance( ) is immediately executed only for non-transactional areas. For transactional areas, the area instance is not hard deleted before with the next database commit. For non-transactional areas, the return parameter rc contains the following values:

|  | terminate_changer = true: | terminate_changer = false: |
| --- | --- | --- |
| cl_shm_area=>rc_done | All area instance versions were successfully set to out-of-date and/or a change lock was released. | All area instance versions were successfully set to out-of-date. |

-continued

|  | terminate_changer = true: | terminate_changer = false: |
|---|---|---|
| cl_shm_area=>rc_nothing_to_be_done | Neither an active nor out-of-date area instance version nor a change lock on the specified area instance exists in the shared objects memory. | Neither an active nor an out-of-date area instance version of the specified area instance exists in the shared objects memory. |
| cl_shm_area=>rc_instance_name_not_found | The specified area instance does not exist. | The specified area instance does not exist. |

For transactional areas, the class method always returns cl_shm_area=>rc_done.

The class method free_area( ) can be used for the hard deletion of all area instances of an area:

```
CLASS-METHODS free_area
    IMPORTING terminate_changer    TYPE bool
                                   DEFAULT true
    RETURNING value (rc)           TYPE REF TO cl_shm_rc
    RAISING    cx_shm_parameter_error.
```

Only for non-transactional areas, the area instances are immediately hard deleted after free_area( ) is called. For transactional areas, the deletion is only carried out after with the next database commit.

For non-transactional areas, the return parameter rc returns one of the following values:

|  | terminate_changer = true: | terminate_changer = false: |
|---|---|---|
| cl_shm_area=>rc_done | All versions were successfully set to out-of-date or a change lock was released. | All versions were successfully set to out-of-date. |
| cl_shm_area=>rc_nothing_to_be_done | Neither an active nor out-of-date version nor a change lock exists in the shared objects memory. | Neither an active nor an out-of-date version exists in the shared objects memory. |

For transactional areas, the class method always returns cl_shm_area=>rc_done.

Note that free . . . ( ) only sets active and out-of-date versions to out-of-date. This is done by invalidation of the active area instance version and the detaching of all read users from all versions of the area instance. Optionally, a possibly active exclusive lock can also be released. In addition, free . . . ( ) can be used to explicitly displace area instances. The memory occupied by out-of-date versions is automatically released with the help of the garbage collector.

Determining the Area Instances

The class method get_instance_infos( ) returns all names of area instances being built, and of active and out-of-date area instances for the defined area. The return value provides the current status of the specified shared objects memory area, which can change any time.

```
CLASS-METHODS get_instance_infos
        RETURNING value(infos) TYPE shm_inst_infos.
    The back given table is of the row type shm_inst_info:
TYPES: BEGIN OF shm_inst_info,
```

-continued

```
            client              TYPE mandt,
            name                TYPE shm_inst_name,
            versions_in_build   TYPE i,
            versions_active     TYPE i,
            versions_obsolete   TYPE i,
        END     OF shm_inst_info.
TYPES: shm_inst_infos TYPE TABLE OF shm_inst_info.
```

The first column of the table contains the actual client in the case of client-dependent areas; a blank client is provided otherwise. The second column contains all names (name) of the area instances. The following three columns contain the number of the versions of the area instance being built (versions_in_build), active versions (versions_active) or out-of-date versions (versions_obsolete). A version, for which an area commit has failed, but which has not yet been rejected with an area rollback, is also regarded as out-of-date. Logically, the columns versions_in_build and versions_active can only contain the values 0 or 1. In the column versions_obsolete the values 0 to n are possible. In this case, n is the version number of the area instance. Since out-of-date area instances are not listed, each table entry contains at least one value other than 0.

If the table is initial, no area instances exist. If the default area instance name stored in the constant cl_shm_area=>default_instance is used, a table entry contains the contents of this constant ($DEFAULT_INSTANCE$).

Handle Types

The instance method get_lock_kind( ) can be used to test whether an area handle was used for reading, updating or writing:

METHODS get_lock_kind
    RETURNING value(lock_kind) TYPE shm_lock_kind.

If the call of this method was successful, the return value has one of the following five values:

| | |
|---|---|
| cl_shm_area=>lock_kind_read | It is a read handle. |
| cl_shm_area=>lock_kind_write | It is a write handle. |
| cl_shm_area=>lock_kind_update | It is an update handle. |
| cl_shm_area=>lock_kind_completion_error | A detach_commit ( ) was already called on this change handle. However, an error occurred during the commit so that now only a rollback is allowed on this handle. |
| cl_shm_area=>lock_kind_detached | The area handle was already released with detach. |

To enable session memory to be treated as a shared objects memory area when creating a data object with CREATE, a roll area handle exists. This roll area handle is an instance of the class cl_shm_roll_area and can also be specified as handle following the keyword AREA HANDLE for CREATE. In this case, the data object is created in the roll area (i.e., a part of session memory) as for CREATE without the keyword AREA HANDLE.

The instance method is_roll( ) can be used to distinguish whether it is an area handle or a roll area handle:
METHODS is_roll
RETURNING value(roll) TYPE bool.

If is_roll( ) is called on a handle already released with detach . . . ( ), the instance method returns false.

Status of the Handles

The instance method get_detach_info( ) allows one to determine the reason for an invalid area handle:
METHODS get_detach_info
RETURNING value(detach_info) TYPE shm_detach_info.

The return value detach_info returns one of the following values:

The instance method is_active_version( ) can be used to check whether the handle still points to the active version of the area instance:
METHODS is_active_version
RETURNING value(active_version) TYPE bool.

If the handle still points to the active version, the method returns true. If the handle is used to access an out-of-date version or the handle has already been released, false is returned. If the method is_active_version( ) is called on a change handle, it also returns false.

If is_active_version( ) is called on the roll area handle, true is returned.

The instance method has_active_attributes( ) can be used to check whether the current dynamic area attributes correspond to the attributes of the area instance:
METHODS has_active_attributes
RETURNING value(active_attributes) TYPE bool.

The method has_active_attributes( ) is called from a handle, which points to the area instance version v of the area g. t is the point in time, at which the build of the version v was started. The method has_active_attributes( ) returns false if the dynamic area attributes of the area g were changed after the point in time t.

If has_active_attributes( ) is called on the roll area handle, true is returned.

Link to the Data Class

Before one can work with an area instance, one must assign an instance of the root data class to it. This object corresponds to the root object of the area. The assignment of the root object can be changed after every attach_for_write( ) or attach_for_update( ). The instance method set_root( ) can be used to change the assignment. This method changes the value of the read-only attribute root.

| | |
|---|---|
| cl_shm_area=>detach_info_not_detached | The area handle is still valid. This value is also returned if a commit has failed on the area handle, but a rollback has not occurred yet. This value is also returned when get_detach_info ( ) was called on the roll area handle. |
| cl_shm_area=>detach_info_handle | The shared or change lock was explicitly released with detach ( ), detach_commit ( ) or detach_rollback ( ) |
| cl_shm_area=>detach_info_area | The shared or change lock was released through a detach_area ( ) or detach_all_areas ( ) . |
| cl_shm_area=>detach_info_attach | The shared lock was released through a attach_for_write ( ) with attach_mode = cl_shm_area=>attach_mode_detach_read user. |
| cl_shm_area=>detach_info_invalidate | The change lock was released through an invalidate . . . ( ) with terminate_changer = true. |
| cl_shm_area=>detach_info_synchronize | The change lock was released through a synchronize . . . ( ) . |
| cl_shm_area=>detach_info_free | The shared or change lock was released through a free . . . ( ) . |

The instance method is_valid( ) can be used to check whether a handle can be used to also access an area instance version:
METHODS is_valid
RETURNING value(valid) TYPE bool.

If the access is still possible, the method returns true. Otherwise false is returned. If is_valid( ) is called on the roll area handle, true is returned.

In addition to get_lock_kind( ) and get_detach_info( ), is_valid( ) provides a simple test regarding the validity of the handle.

METHODS set_root
IMPORTING root TYPE REF TO cl_my_data
RAISING cx_shm_wrong_handle
cx_shm_initial_reference.

With the method set_root( ), only one other instance of the root data class can be specified. The specification, from which class the root object for this area instance must be created, is made using the maintenance tool at design time.

Note that prior to the detach_commit( ), the root object must have been set. In addition, all objects accessible from the root object must lie in the same area instance as the root object. Otherwise, an exception occurs with the area commit.

The following exceptions can result from executing set_root( ):
- cx_shm_wrong_handle with the text element write_handle_required: The method set_root( ) was called by means of a read handle.
- cx_shm_initial_reference: The reference passed to root is INITIAL.

Both exceptions are declared as a dynamic check and thus do not force any processing.

To access the root object of an area instance, a program can directly access the read-only attribute root in the area class.
DATA root TYPE REF TO cl_my_data READ-ONLY.

If the area handle has already been released with detach, a runtime error that cannot be caught occurs when the attribute root is accessed.

The method get_root( ) for determining the root object should only be used in exceptional cases in which the program must generically deal with several area handles for different areas with different root data classes.
METHODS get_root
RETURNING value(root) TYPE REF TO if_shm_enabled
RAISING cx_shm_already_detached.

Area Constructor

The user can activate the automatic build of the area instance in the maintenance tool at design time using the parameters refresh time (refresh_time) and the autostart attribute (build_kind). It is therefore possible to regularly update the area instance, create the area instance—if need be—or to always hold it active in the shared objects memory. An area constructor is needed so that an area instance can be built automatically. If the automatic build of an area instance is activated, the area constructor must exist. If no automatic build of the area instance is to be carried out, the specification of the area constructor is voluntary.

The area constructor corresponds to the class method build( ) that must be implemented in its own class (for example, cl_my_area_constructor). The name of the area constructor class is defined at design time. The area constructor must be made available by means of the interface if_shm_build_instance:
CLASS-METHODS if_shm_build_instance-build
IMPORTING inst_name
TYPE shm_inst_name
DEFAULT cl_shm_area=>default_instance
invocation_mode
TYPE i
DEFAULT
cl_shm_area=>invocation_mode_explicit
RAISING cx_shm_build_failed.

This class method is automatically called at the points in time specified at design time. It is also possible to call the area constructor directly by means of the class method build( ) lying in the generated area class (for example cl_my_area):
CLASS-METHODS build
IMPORTING inst_name
TYPE shm_inst_name
DEFAULT cl_shm_area=>default_instance.
invocation_mode
TYPE i
DEFAULT
cl_shm_area=>invocation_mode_explicit
RAISING cx_shm_build_failed.

When implementing the area constructor method build( ), one should adhere to the following framework:
CLASS cl_my_area_constructor IMPLEMENTATION.
METHOD if_shm_build_instance_build.
DATA:
my_handle TYPE REF TO cl_my_area,
my_data TYPE REF TO cl_my_data,
my_except TYPE REF TO cx_root.
TRY.
my_handle =cl_my_area=>attach_for_write
(inst_name
CATCH cx_shm_error INTO my_except.
RAISE EXCEPTION TYPE cx_shm_build_failed
EXPORTING previous = my_except.
ENDTRY.
CREATE OBJECT my_data AREA HANDLE my_handle.
my_handle->set_root (my_data ).
... " code for setting up the entire area instance
TRY.
my_handle->detach_commit( ).
CATCH cx_shm_error INTO my_except.
RAISE EXCEPTION TYPE cx_shm_build_failed
EXPORTING previous = my_except.
ENDTRY.
" when a constructor is called automatically to build a
" transactional area, a database commit must occur
IF cl_shm_area=>invocation_mode_auto_build = invocation_mode.
CALL FUNCTION 'DB_COMMIT'.
ENDIF.
ENDMETHOD.

The area constructor must set an exclusive lock on the area instance at the beginning, which is then released at the end of the area constructor again. With attach_for_write( ) it is necessary to pass the area instance name so that the area constructor does not only generate the area instance with the default name. Even with the automatically started area constructor it is not certain that it is possible to set the exclusive lock. For this reason, all exceptions should be caught and using cx_shm_build_failed be passed on to the caller of the constructor using the instance attribute previous. In an automatically started area constructor, exceptions are logged and the constructor is aborted.

As with every build of an area instance, the area constructor must create a root object.

If the area constructor is automatically started, for example, through an attach_for_read( ), the read request does not wait until the build of the area instance with the area constructor is completed, but immediately returns to the application program with an exception. The automatically called area constructor therefore runs parallel to the application program. A database commit must be carried out so that the version for transactional areas created by the area constructor is activated immediately after the end of the area constructor. However, this database commit must not have any influence on the database commit behavior of the application program. For this reason, the automatically called area constructor for transactional and non-transactional areas runs in a separate database transaction. The database commit, necessary for transactional areas, must be explicitly called in the area constructor since no automatic database commit occurs at the end of the transaction.

If the area constructor is called by means of the class method build( ), it does not run in a separate database transaction. It might not always be desired that the database commit is executed in the area constructor when the area constructor is started with the method build( ). Since the database commit in the area constructor is required for the automatic build of the area, the distinction must be made in the area constructor whether it was started automatically or explicitly by means of the method build( ). The parameter invocation_mode can be used to make this distinction. If the area constructor is started by means of the method build( ) and the parameter invocation_mode is not passed, it receives the default value cl_shm_area=>invocation_mode_explicit in the area constructor. If the area constructor is called automatically, the parameter invocation_mode receives the value cl_shm_area=>invocation_mode_auto_build. By means of a simply query for the parameter invocation_mode at the end of the area constructor, it is possible to execute the database commit only for an automatically called area constructor.

If the area constructor is started through a build( ) method, it runs under the current user. If the constructor is started automatically, it runs under a special system user. A developer can establish the attributes of the system user for an area using the development tool.

Client-Dependent Areas

The concept of client-dependent areas derives from client-dependent tables in SAP R/3 databases. There are two types of tables in an R/3 database: client-dependent and client-independent. In an R/3 system, a client is a self-contained unit with separate master records and its own set of table data (in commercial, organizational, and technical terms). A table is client-dependent if the first field is of type CLNT. By convention, this field is always named MANDT. The logon client mechanism divides the rows within a client-dependent table into distinct groups. To access a different set of data, the user logs on and specifies a different client number.

With client dependency, shared objects memory areas behave in an analogous way. A developer can declare an area to be client-dependent or client-independent using the static area attribute is_client dependent. With client-dependent areas, two area instances are only the same if the instance name and client are the same.

When called from a client-dependent area, the methods attach_for_read( ), attach_for_write( ), attach_for_update( ), multi_attach( ), detach_area( ), detach_all_areas( ), invalidate_instance( ), invalidate_area( ), synchronize_instance( ), synchronize_area( ), free_instance( ), free_area( ) and get_instance_infos( ) always act on the current client area.

In addition, the client can be an explicit parameter to the following methods:

1) The methods attach_for_read( ), attach_for_write( ) and attach_for_update( ) have the optional importing parameter client of type mandt. This makes it possible to set a lock on an area for an arbitrary client. If the parameter client is not provided, the current client is used.

2) The method multi_attach( ) can in one call be called for both client-independent and client-dependent areas.

3) The methods detach_area( ), invalidate_instance( ), invalidate_area( ), synchronize_instance( ), synchronize_area( ), free_instance( ), free_area( ) and get_instance_infos( ) have an optional client parameter. If the methods are called with the parameter client, the methods operate only on areas of the indicated client. Otherwise, they operate only on the current client. For the methods to operate on all clients, the parameter client should be given the constant value cl_shm_area=>all_clients.

The method detach_all_areas( ) does not have an optional client parameter. It always operates on all locks of a program session, regardless of client status.

The method build( ) does not have an optional client parameter. With this method an area can only be constructed for the current client. For an automatic area construction, the current client is set so that the area is constructed for the desired client.

With client-dependent areas, user-specific area attributes can be established for each client.

Displacing an Area Instance

An area instance can only be displaced when there are not any readers left on this area instance. Only the active version of the area instance is then left (in case of displacement) in the shared objects memory.

If an area instance may be displaced from the shared objects memory because of a lack of memory, the developer can choose from two displacement types in the area attributes.

In the first case, the area instance is simply invalidated, that is, the active version expires. A new read access on the area instance is not possible until the area instance has been built again.

The second displacement type saves the contents of the area instance to disk. The area instance is loaded into the shared objects memory again with a new read or change access. To realize the storage and loading operations, it is necessary to implement the tag interface if_serializable_object in each class instantiated in the area instance. For this purpose, the methods serialize_helper( ) and deserialize_helper( ) may have to be implemented in the class.

Attributes of the Class cl shm roll area

So that programming using a shared objects memory area can be the same as programming using the roll area, a distinguished area class exists for the roll area. The class cl_shm_roll_area represents this distinguished area class for the roll area. An instance of the class cl_shm_roll_area thus represents a roll area handle. As all generated area classes, cl_shm_roll_area also inherits from the class cl_shm_area.

It does not make any sense, however, to call the instance methods made available by cl_shm_area for the roll area, except for is_roll( ), get_detach_info( ), is_valid( ), is_active_version( ) and has_active_attributes( ). For this reason, the following instance methods are redefined in the class cl_shm_roll_area so that calling these methods returns the exception cx_shm_roll_handle of the type cx_no_check: detach( ), detach_commit( ), detach_rollback( ), get_lock_kind( ), and get_root( ).

Unlike the generated area classes, the class cl_shm_roll_area does not contain any methods that are not contained in the class cl_shm_area.

Area Attributes

The generated area class inherits the following read-only instance attributes from cl_shm_area, which represent the area attributes set at design time. The area attributes are automatically filled with the help of the instance constructor during the creation of a new area instance version. The values of the attributes are stored in a database table.

The maintenance tool can be used to change the area attributes.

Static Area Attributes

Once static area attributes are changed, all area instance versions of the area are automatically flagged as out-of-date. If there are reading or changing users working on the versions, they are detached. After static area attributes have been changed, it is not possible to set a new shared or update lock on the area instances of the area.

A developer key is necessary for changing the static area attributes.

Area name:

CONSTANTS area_name TYPE shm_area_name VALUE . . .

This attribute contains the name of the area. The area name corresponds to the class name. After changing this attribute, the area class is regenerated.

This attribute is stored as a constant in the generated class and does not lie in the class cl_shm_area.

Name of the Root Data Class:

The name of the root data class is not directly stored in an attribute of the area class.

To ensure a type-stable access to the attribute root, ROOT is typed in the generated area class with REF TO cl_ . . . (name of the root data class). A change to the name of the root data class thus forces the regeneration of the area class.

Client dependency:

DATA is_client_dependent TYPE bool READ-ONLY.

The value of this flag is false if the area is client independent. This is the default value. If the value is true, there will be a client-dependent separation of area instance versions.

Active or Inactive Versioning:

This flag specifies whether the area in question is an area with or without versioning. The default value is false, that is, the area does not have a versioning. If has_versions is set to true, a maximum version number (attribute max_versions) must be defaulted.

Context for binding all area instances of an area:

DATA life_context TYPE shm_life_context READ-ONLY.

In the area administration a context determining visibility and lifetime is assigned to an area. Area name and area instance name are unique for each context. One of the following four binding contexts must be specified:

| | |
|---|---|
| cl_shm_area=> life_context_appserver | The area instances of the area live just as long as the application server does. This is the default value. Shared objects memory areas are logically attached to an application server instance and not to the host. With several parallel application server instances on the very same host, the areas therefore exist, independent from one another, once per application server instance. |
| cl_shm_area=> life_context_session | The lifetime of the area instances of the area depends on the lifetime of the user. |
| cl_shm_area=> life_context_mode | The area instances of the area live just as long as the user session does. |
| cl_shm_area=> life_context_memory | The lifetime of the area instances of the area depends on the lifetime of the respective program session. |

Transactional areas:

DATA is_transactional TYPE bool READ-ONLY.

If the value of this flag is true, each change to the area instances of the area is only activated with the database commit. This ensures that the data in the shared objects memory and on the database is consistent. Otherwise, the user must take his own precautions regarding the consistency of the area contents with the database contents.

At design time, the value true is defaulted for the parameter is_transactional.

Synchronization of the area:

DATA sync_kind TYPE shm_sync_kind READ-ONLY.

This attribute specifies when and by whom the synchronization method synchronize . . . ( ) for sending the synchronization records is called:

| | |
|---|---|
| cl_shm_area=>sync_kind_none | No synchronization mechanism is available. In this case, the method synchronize . . . ( ) is not generated. |
| cl_shm_area=> sync_kind_user_triggered | The user calls the method synchronize . . . ( ) himself. |
| cl_shm_area=> sync_kind_automatic | The synchronization method synchronize_instance ( ) is automatically called with each change to one of the elements specified under dependencies. With the automatic call of the synchronization method, the synchronization record is sent to all servers (affecting_local_server = true). The user can also call the synchronization method explicitly as can be done with setting sync_kind_user_triggered. |

Dynamic Area Attributes

If the dynamic attributes of an area are changed, this change is valid as of the next write operation in an area instance of this area. The version active at the time when the area attributes were changed and all out-of-date versions are not affected by the change. A shared lock can therefore be set on the area instances of this area also after the change of the dynamic area attributes.

A developer key is required for changing the dynamic area attributes.

The method has_active_attributes( ) allows the program to check whether the dynamic area attributes were changed after the area instance version was created.

If the changes of the dynamic area attributes are to be activated immediately, an invalidate . . . ( ), synchronize . . . ( ) or free . . . ( ) is to be executed on the area instances.

Area instance name:

DATA inst_name TYPE shm_inst_name READ-ONLY.

This attribute contains the area instance name. This may have a maximum of 80 characters.

Client:

DATA client TYPE mandt READ-ONLY.

This attribute contains the client name of the client for the area. In the case of client-independent areas, this attribute has a null value of space.

Automatic area structure:

DATA is_auto_build TYPE bool READ-ONLY.

If is_auto_build is set to false, no automatic build of the area instances of this area is possible.

The automatic area build is only possible for areas that are linked to the application server regarding their lifetime and visibility. In addition, a constructor class is needed for the automatic area build. The points in time, at which the automatic area build is to occur are set by means of the attribute build_kind.

The default value is true.

A refresh time not equal to 0 can only be specified for areas with is_auto_build = true.

Dependencies for area synchronization:

CLASS-DATA dependencies TYPE shm_dependencies READ-ONLY.

All elements, whose change should trigger the corresponding synchronization method to be started, must be entered in this table. This table is only generated if the attribute sync_kind was set to cl_shm_area=>sync_kind_automatic.

The names of the following elements can be stored in the table: programs, database tables, type group types, class pools, global types, local types, global classes and local classes. Every time the definition of an element contained in the table or the data stored in an element is changed, the synchronization method is triggered.

Name of the constructor class:

DATA auto_build_class_name TYPE shm_build_class_name READ-ONLY.

In this constant, the name of the class is specified which uses the interface if_shm_build_instance to implement the constructor for the automatic build of the area instances.

Only if the auto_build_class_name is not INITIAL can the attribute is_auto_build assume the value true.

Attribute for displaceability:

DATA displace_kind TYPE shm_displace_kind READ-ONLY.

This attribute specifies whether the area instances of the area may be displaced. An area instance can be displaced only if no reader is attached to this area instance anymore. If an area is displaced with build_kind = cl_shm_area=>build_kind_due_to_invalidation or build_kind_startup, it is only automatically built after the displacement again when a new read request is made.

| | |
|---|---|
| cl_shm_area=>displace_kind_none | The area instances cannot be displaced. This is the default value. |
| cl_shm_area=> displace_kind_serializable | The area instances can be displaced. Prior to displacing, the area contents is written to the hard disk. With a read or update access to the area instance, it is then loaded into the memory again. |
| cl_shm_area=> displace_kind_displaceable | The area instances can be displaced. The area contents are lost with the displacement. |

User-Dependent Area Attributes

As the dynamic attributes, the user-dependent area attributes are valid only as of the next change of the area instances belonging to this area. Also no area instance version is invalidated with the change of the user-dependent area attributes.

The difference between user-dependent and dynamic area attributes is that user-dependent area attributes can be changed by a user without developer rights. Maximum version number:

DATA max_versions TYPE i READ-ONLY.

This figure provides the maximum number of versions that are simultaneously available for each area instance of this area. Expired areas are not considered with the specification of the version number. If the value 0 is entered, the version number is unlimited.

For areas without versioning (has_versions = false) this value always has the value 1.

If the area is an area with versioning (has_versions = true), max_versions can be set to any value other than 1.

Attribute for Autostart:

DATA build_kind TYPE shm_build_kind READ-ONLY.

This attribute can be used to control when the area instances of the area are to be built automatically with the help of the area constructor.

| | |
|---|---|
| cl_shm_area=> build_kind_none | An area instance is not built automatically. This value is assigned to the attribute build_kind if is_auto_build = false is valid. For areas with is_auto_build = true, this value cannot be assigned to the attribute build_kind. |
| cl_shm_area=> build_kind_due_to_read_request | If no active version of the area instance exists, the area constructor is automatically called with a read-request. This is the default value for areas with is_auto_build = true. |
| cl_shm_area=> build_kind_due_to_invalidation | The area constructor starts at the points in time described under build_kind_due_to_read request. In addition, the area constructor is called when the active area instance version is set to out-of-date or expired, without a new active area instance version being created in this case. This setting ensures that an existing area instance is kept alive. |
| cl_shm_area=> build_kind_startup | The area constructor starts at the points in time described under build_kind_due_to_invalidation. Area instances of the area are additionally created upon each restart of the system. The names of the area instances to be generated must be entered at design time. The area instance names are stored in the table startup_list. |

An area instance that was displaced is not immediately re-built in spite of the setting build_kind_due_to_invalidation or build_kind_startup. An automatic build only occurs with a further read access on this area instance.

If this attribute is changed to build_kind_due_to_invalidation or build_kind_startup and if no active version of the area exists at the point in time of the change, no automatic build of the area is triggered for the point in time when the area attribute is changed.

List of Area Instance Names for Automatic Area Build

DATA startup_list TYPE shm_inst_names READ-ONLY.

The type shm_inst_names is defined as follows:

TYPES:

shm_inst_names TYPE HASHED TABLE OF shm_inst_name

WITH UNIQUE KEY table_line.

The table contains the names of all area instances that are to be automatically created for this area when the application server is started. If the default area instance is to be created automatically, the table must contain the value $DEFAULT_INSTANCE$. This value can be added and removed by means of a check box at design time. This table is not initial (i.e., it does not have its type-specific initial value, e.g., it has no rows) only if the area attribute build_kind has the value cl_shm_area=>build_kind_startup.

Refresh time for stored data:

DATA refresh_time TYPE i READ-ONLY.

This parameter specifies a time period in minutes, after which the build of a new version is started by means of area constructor. In case of active versioning, reading users can continue to attach to the area instance during the rebuild. The counter restarts after each detach_commit( ) on the area instance. The default value is 0 minutes, that is, the area instance is never rebuilt automatically. This parameter can be set to a value other than 0 only in the case if is_auto_build = true and invalidation_time = 0.

Expiration time for the stored data:

DATA invalidation_time TYPE i READ-ONLY.

This parameter specifies a time period in minutes, after which the stored data becomes out-of-date. Out-of-date data remains accessible for already attached reading users, that is, previously set shared locks remain set. The counter restarts after each detach_commit( ) on the area instance. The default value is 0 minutes, that is, the area instance is never invalidated.

A value other than 0 can be selected only of the refresh time is 0; that is, only one of the expiration time and the refresh time can be non-zero.

For the expiration time, unlike the refresh time, no active version exists after the expiration point in time. This is also valid if build_kind = cl_shm_area=>build_kind_due_to_invalidation or build_kind_startup applies. In this case, the area constructor indeed starts only after the area instance has expired.

For area instances without versioning, it does not make a difference whether refresh time or expiration time and automatic startup of the area constructor for expired area instances is used.

Memory limit:

DATA max_version_size TYPE i READ-ONLY.

The maximum permissible size of an area instance version in kilobytes is set by the attribute max_version_size. By default, no limit is predefined for the size of an area instance version.

DATA max_area_size TYPE i READ-ONLY.

The maximum permissible size of an area in kilobytes is set by the attribute max_area_size. The current size of the area corresponds to the total of the sizes of all versions of all area instances of this area.

If both attributes max_version_size and max_area_size are set to values other than 0, which indicates there is no limit, max_version_size ≦ max_area_size must apply.

If the maximum size of an area instance version is reduced and if the active version is greater than the specified value, read accesses to the active version are possible, but setting a change lock results in a memory error.

The Data Class

This section explains how the data created with the help of the statement CREATE. AREA HANDLE . . . must be organized in the shared objects memory.

As already mentioned with the method set_root( ), instances of data classes can be generated in the shared objects memory. A data class distinguishes itself from any class by the fact that it implements the tag interface if_shm_enabled. Through the implementation of the interface, a class indicates that their instances are prepared for a storage in the shared objects memory.

A change to the definition of a class instantiated in the shared objects memory results in the invalidation of the area instance. Also all change locks on this area instance are cancelled in this case. The shared locks however remain.

For area instances with versioning, different reading users on the same area instance (but different versions) can access data objects with the same name but with different types.

Both locally and globally defined classes can be created in the shared objects memory. When using locally defined classes in the shared objects memory, consider that when program p changes, all classes defined in p are flagged as changed. This also applies if no change at all is made to the class definition. Since with every change of a class instantiated in the shared objects memory, the area instance is invalidated. The area instance is also invalidated with each program change when local classes are used.

Different programs p1, . . . , pin exist that operate on an area instance g. In addition, a program q exists that defines the local class k. All operations on the local class k are executed in program q, that is, only program q needs to know the definition of the class k. Program q is called by different programs $p_j$. With these calls, q creates instances of the class k in the area instance g or accesses already created instances.

An example for the possible use of local classes is the exclusive buffer scenario. In this scenario, only one program that accesses the shared objects memory exists most of the time.

In the shared buffer scenario, a large number of different programs directly access the data available in the shared objects memory. For this case globally defined classes are useful.

If some data d lying in an area instance is accessed only from a program p, it is sufficient if the data types are defined by d locally in the program p. Prior to the first call of the program p, it must be loaded into the roll area. This dynamic program loading is carried out already with the call of the method attach_for . . . ( ) and not only with the actual access to the program p. This results in the program component LOAD-OF-PROGRAM of the program p being already executed with the attach_for . . . In addition, a consistency check is carried out with the attach_for_read/update( ). The consistency check tests whether the types of data lying in the shared objects memory correspond to the types known in the program. The exception cx_shm_inconsistent is triggered in the case of an error.

In addition to programs with locally defined classes and types, all global types instantiated in the shared objects memory are reloaded with the attach_for . . . ( ).

Visibility of Area Changes

Transactional vs. Non-transactional Areas Generally the data stored in the area instances depends on database contents. To receive consistent data when accessing the database and the shared objects memory, one must link the writing to the database with the writing to the shared objects memory. This behavior of database and shared objects memory can be set by means of the area attribute is transactional.

Transactional areas

The basic concept of this model is the consistency of database and area changes. Thus, the changes to area contents must be activated at the same time as the database updates. Only this always enables a consistent view of the stored data in case of dependencies between the database and the shared objects memory.

If the changing user terminates his access to the shared objects memory with detach_commit( ), the area-committed data is only activated with the next database commit. For areas with versioning, shared locks requested between the detach_commit( ) and the database commit still point to the last version confirmed with a database commit. If it is an area without versioning, a read access to the area instance is only possible after the database commit. No new exclusive lock can be set between the area and database commit. If an exclusive lock is released with an area rollback, it is possible to set a new exclusive lock already before the next database commit.

The consistency of database contents and the contents of the shared objects memory also has a disadvantage, however: none of the transactional area instances must have an exclusive lock when the database commit is executed. If an open exclusive lock still exists, a runtime error occurs that cannot be caught. Accordingly, a writing user in a transactional area instance needs the control over the database commit.

In addition, it is not possible to leave an exclusive lock open when switching to another program session. In this case, a runtime error that cannot be caught also occurs. This restriction for calling up a database commit in a new program session was introduced so that a runtime error does not occur due to the exclusive lock of another program session that has not been released yet with an area commit or detach.

If the area contents depend on database updates, area changes should be made where the database updates occur. The database updates can be carried out online or with the update.

If the database updates are carried out online, two cases are to be distinguished:

(1) The change of the database contents is made directly in the source code. Then the change of the area contents should also be made directly in the source code.

(2) The change of the database contents is done ON COMMIT. Then the area changes should also be made ON COMMIT. Variant (2) is to be preferred over (1) since the database updates in the same program session become visible immediately; the area changes, on the other hand, only with the database commit.

For the case that the database updates occur with the update, the area changes should only be made upon completion of the database update and after returning from the update.

Instead of directly changing the area contents, it is also possible to invalidate the area instance. For this case, the area constructor should exist, which then rebuilds the area instance. When linking area and database changes, the behavior of the area instance depends on two commands: the command for releasing the area update lock and the following command for terminating the database transaction.

| Command for releasing the area update lock | Command for terminating the database transaction | Behavior of the shared objects memory |
| --- | --- | --- |
| detach_commit ( ) | Database commit | Area changes are activated with the database commit |
| detach_commit ( ) | Database rollback | Area changes are never activated; for area instances with versioning, no new version is generated |
| detach_rollback ( ) | | Area changes are rejected immediately |
| Lock not released | Database commit | Runtime errors that cannot be caught |
| Lock not released | Database rollback | Area changes are rejected immediately, the lock is implicitly released |

Non-Transactional Areas

With the non-transactional areas model, the changes of the area contents and the changes to the database are fully detached. If the area contents and the data lying on the database are to be kept consistent, the user is responsible for the possible simultaneous change of the data in the area instance and on the database.

The advantage of this model is the possibility to keep an exclusive lock active, ignoring a database commit. Accordingly, the writing user no longer needs the control of the database commit.

Cross-server Synchronization

Generally area instances lying in the shared objects memory will be created on several application servers. If the areas involved are local areas, independent of each other, there is no need for synchronization. If the area instances are shared by several servers, the usage of synchronization mechanisms is necessary. Note that the cross-server sharing of data can be achieved only by copying the data.

From the point of view of the application development, the following points should be considered in connection with the synchronization of area contents:

Is the buffer a local or synchronized buffer?

How are the database updates made, online or with the update?

Where are the buffers needed, only online, only with the update or online and with the update?

Are resulting inconsistencies accepted if database commits and the sending of synchronization records are carried out delayed?

With synchronization records are sent through the database, a database commit is necessary after the synchronization records have been created.

The sending of the synchronization records for the area synchronization should be based on the mechanism for writing database updates. Generally, synchronization records for area instances will depend on other synchronization records (for example, on DB buffer synchronization records). On principle, the synchronization records should be sent from where also the database updates are made. If the database updates are stored in an update module, the dependent area changes and the sending of the respective synchronization records should be carried out with the update. This simultaneously activates the database updates and area changes on all servers.

Due to the shipping of the synchronization records via the database, all area synchronization records expire, in addition to the database and area changes, with a database rollback.

For transactional areas, the user can use the area attributes (sync_kind) to choose between two synchronization modes. The first mode provides the user with synchronization methods (synchronize . . . A call of these synchronization methods results in the synchronization records being written to the database. In this case, a flag can be used to control whether the server, from which the synchronization records were sent, receives a synchronization record as well. The next database commit makes the synchronization records visible for all servers, which in turn results in the expiration of the area instance.

The second mode includes the automatic sending of the synchronization records via the database. The information which area instances must be synchronized is stored in the table dependencies. As with the first mode, the user is additionally provided with two synchronization methods he can use to send the synchronization records.

Consider two time example schedules for the synchronization of area instances. In both cases, the synchronization records from Server 1 are sent to all other servers, but, in the first case, not to Server 1 (affecting_local_server = false). After the database commit, some time elapses until the synchronization records can be read from the database and the area instance is invalidated. Assuming the area constructor is automatically triggered with the invalidation of the area instance, the version created by the area constructor is available for read accesses on Server 2 after a while. The version created by the area constructor does not have to correspond to version 2 on Server 1.

In the second case, the synchronization records are sent to all servers, thus also to the sending server (affecting_local_server =true). Note that after the database commit, version 2 on Server I is active for a short time in the upper part of the chart. The receipt of the synchronization records then results in the invalidation of the area instance on all servers. In this case as well, the area constructor is configured so that it automatically starts after the invalidation of the area instances. Assuming that the area contents depends only on database contents, the area instances created by the area constructor contain the same data on all servers.

Area Invalidation Through Transport Requests

If the contents of an area instance lying in the shared objects memory depends on data, which is transferred to a current system by means of a transport request, the import of the transport request must result in the invalidation of the area instance. In the absence of a synchronization method provided for this case, the following trick can be employed. If an area instance is to be invalidated from a transport request, this transport request must modify the type definition of the root data class of the corresponding area instance. The easiest way to do this is to implement a class constant that is increased with every new transport request. An exception is then triggered by the modification of the type of the root data class when a new shared or update lock is set on the area instance.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component (e.g., a data server), a middleware component (e.g., an application server), or a front-end component (e.g., a client computer having a graphical user interface or a Web browser through which a user can interact with an implementation of the invention), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments, but other embodiments can be implemented and are within the scope of the following claims. For example, the operations of the invention can be performed in a different order and still achieve desirable results. Other embodiments are within the scope of the following claims.

What is claimed is:

1. A development environment for developing application programs in a computer programming language and a runtime environment for running application programs developed using the development environment, the development and runtime environment comprising:

a development environment programmed to enable a developer using the development environment to declare an area class at design time, where the developer declares shared memory behaviors in the area class declaration;

the area class declaration causes the area class to be generated for use by an application at runtime as an organizational unit for a shared objects memory, the shared objects memory is a region of memory managed by the runtime environment that is available to be shared by multiple sessions of one or more applications running in the runtime environment, applications store content in area instances at runtime, an area instance being an instance of the area class, and the declaration of the area class causes instance methods to be defined and generated, the instance methods including methods for attaching and detaching a running session of an application to and from an area instance, a method for detaching a session from a change request on an area instance with a commit, and a method for detaching a session from a change request on an area instance with a rollback; and code in the runtime environment that manages locks for area instances, locks applying to individual area instances as a whole, the runtime environment permitting to be attached to a particular area instance only (i) one or more readers, or (ii) exactly one changer, a changer being a writer or an updater, or (iii) no readers or changers; and code in the development and runtime environments that supports programming language constructs for creating area instances and programming language constructs for creating data objects within area instances, where the data objects can be of arbitrary data type including elementary data types, structures, and references.

2. The development and runtime environments of claim 1, wherein:

the attach methods return an area handle, which is a reference to an area instance; and the language constructs for creating data objects refer to an area handle to identify at runtime the area instance in which data objects are to be created and data is to be stored.

3. The development and runtime environments of claim 1, wherein:

the development environment supports the definition of object oriented classes by developers as having the attribute that they are shared memory enabled; and every class that is shared memory enabled can be instantiated in an area instance.

4. The development and runtime environments of claim 1, wherein:

the class methods for attaching a session of an application to an area instance for reading, writing, and updating also request corresponding locks.

5. The development and runtime environments of claim 1, wherein:

all data objects in area instances are generated dynamically at runtime and are accessible to application code through references, the runtime environment provides for the instantiation of arbitrary types of data objects in area instances;

the runtime environment does not permit content in any area instance to contain references pointing outside the respective area instance after commit/rollback; and the runtime environment manages all references to content, providing type safety and complete control of references to content in area instances.

6. The development and runtime environments of claim 1, wherein:

the development environment enables a developer to declare that an area instance can be automatically preloaded by an area class loader at server startup, at the initial (first occurring) read request, or after invalidation; and the area class loader is a constructor that satisfies a loader class interface and that is started asynchronously in a separate session.

7. The development and runtime environments of claim 1, wherein:

the development environment enables a developer to declare that the area class has versioning for instances of the area class, wherein an area instance version can be in one of the following four states: under construction, active, out of date, or expired;

the declaration of versioning allows the developer to define a maximum number of permitted area instance versions that can exist for a particular area instance at one time in the area class;

if the area class does not have versioning, readers and changers of an area instance block each other, and a read or change request can be satisfied only if no lock is active on the area instance; and if the area class does have versioning, locks apply only to area instance versions, and only changers of the area instance block each other, whereas read requests to an active area version are still satisfied.

8. The development and runtime environments of claim 1, wherein:

the development environment enables a developer to declare that the area class is transactional, wherein an area instance of a transactional area class has its commit and rollback behavior tied to commit and rollback language constructs provided by the programming language and the runtime environment for database commits and rollbacks, and wherein an area instance that experiences a detach and commit becomes active with the next database commit.

9. The development and runtime environments of claim 8, wherein:

the development environment enables a developer to declare that the area class is propagated, wherein an area instance of a propagated area class can be separately instantiated on several application servers, and wherein whenever an area instance changes on one of the application servers, the runtime environment on that application server propagates to the other application servers an invalidation message, causing the other area instances to become out of date.

10. The development and runtime environments of claim 8, wherein:

the development environment enables a developer to declare that the life time of an area instance can be restricted by specifying: a refresh time, invalidation time, or idle time.

11. The development and runtime environments of claim 10, wherein:

the life time can also be bound to a user or program session.

12. The development and runtime environments of claim 1, wherein:

each area instance has a root object as its single point of entry.

13. The development and runtime environments of claim 1, wherein:

the shared objects memory is a reserved part of a shared memory space accessible as shared memory to independent application program processes running on a computer; and an area instance having content can be administered apart from any application program session being attached to the area instance.

14. The development and runtime environments of claim 1, wherein:

the runtime environment is operable to establish hardware memory protection for an area instance that has no changer attached to it.

15. The development and runtime environments of claim 1, wherein:

a tool in the development environment comprises computer program instructions for interacting with the user and computer program instructions for generating program elements for execution or use by the runtime environment;

the development environment is programmed to enable the creation of multiple area classes, where each area class is identified by a unique name; and the runtime environment includes code to build one or more area instances of the area class at runtime, each area instance having a unique name within its respective area class.

* * * * *